July 8, 1969 — N. ABRAHAMS — 3,454,873
BATTERY TESTER
Original Filed July 26, 1967
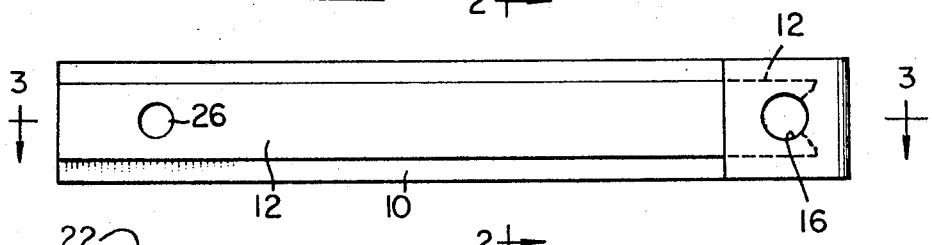
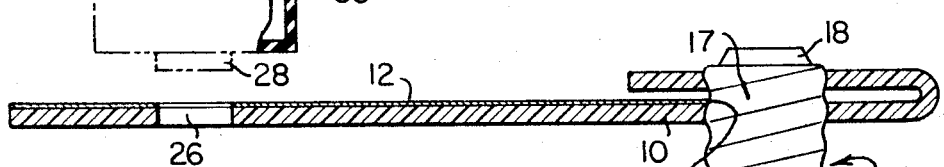
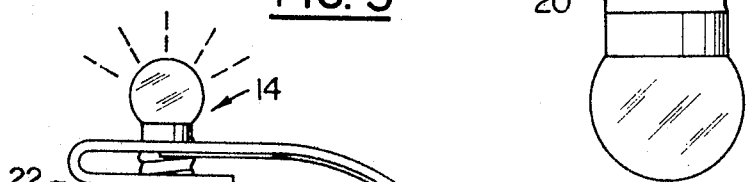
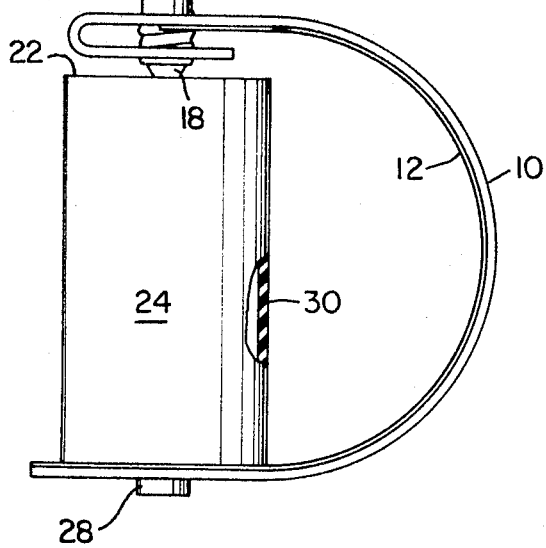
INVENTOR
NORMAN ABRAHAMS
BY Louis Necho
NECHO & KIMMELMAN
ATTORNEYS.

3,454,873
BATTERY TESTER
Norman Abrahams, 1007 Filbert St.,
Philadelphia, Pa. 19107
Continuation of application Ser. No. 656,231, July 26,
1967. This application Jan. 2, 1969, Ser. No. 788,371
Int. Cl. G01r 11/44
U.S. Cl. 324—29.5                       1 Claim

ABSTRACT OF THE DISCLOSURE

A resilient, non-metallic strip; an electric conductor on one side of the strip, and light bulb mounting means at one end of the strip, with or without an opening at the other end of the strip to receive the contact projection, or nose, which forms part of the battery. Engaging the stem of the light bulb with one end of a sound battery and engaging the other end of the strip with the other end of the battery, will energize the light bulb. If the bulb and the tester are sound, and if the bulb does not light up, it means the battery is very weak or is dead.

---

This application is a continuation of application Ser. No. 656,231 filed on July 26, 1967, entitled, "Battery Tester," now abandoned.

Testers of the type referred to are old, but, as far as I am aware, all such testers involve the use of casings and springs and other elaborate, expensive and bulky parts. See, for example, Patents Numbers 1,336,424, 1,337,160, 1,386,474, 1,497,388, 2,104,888, 2,155,778, 2,205,316, 2,522,660 and 2,081,656.

The invention provides a battery tester which is small, light and easy to use, and one which is extremely inexpensive to make so that it can be given away with the sale of batteries or as a premium.

In the drawings:

FIG. 1 is an almost full size plan view of a battery tester embodying the invention, the same being shown in a flat, drawn-out position and not ready for use.

FIG. 2 is an enlarged sectional view looking in the direction of line 2—2 on FIG. 1, showing the tester ready for use.

FIG. 3 is an equally enlarged sectional view looking in the direction of line 3—3 on FIG. 1, with the light bulb and the battery to be tested somewhat exaggerated.

FIG. 4 is an elevational view showing how the tester is used.

The tester illustrated includes a base strip 10 made of any available natural or synthetic non-conducting material which is sufficiently rigid, resilient, light and inexpensive, such as moulded or extruded plastic, including but not limited to poly-styrene, methyl methacrylate, etc. A working prototype was made of polystyrene and was about ½" wide; about ⅟₃₂" thick, and about 5" long. The prototype resumed its flat shape after it was repeatedly bent to, and beyond, the configuration of FIG. 4.

Strip 10 is covered on one side thereof with an electric conductor 12 which may be made of tin foil, or the like, fastened to the strip. If desired, a conducting paint may be applied. It is only necessary that the conductor also be flexible so that it can be repeatedly bent without damage. The conductor may cover the entire width of the strip, or it may cover only the central portion of the strip as shown in FIG. 1. In order to provide enough support for the testing bulb 14, one end of the strip may be made thicker, or a reinforcing pad may be added. One end of the strip may be bent over to provide double walls as shown in FIG. 3. In any event, a hole 16 is punched through the base strip and the foil to receive the screw threaded stem 18 of the test light bulb. Punching hole 16 produces a wall 20 which engages at least one side of the stem 17 of the bulb. If desired, a grommet, not shown, can be applied to hole 16 for reinforcement and for better contact.

The strip described can be used by touching the threaded stem 18 of stem 17 of the light bulb to one end 22 of a battery 24 and by touching the other end of the conductor 12 to the other end of the battery. It will be understood that the light bulb used is conventional and that the screw stem 17 helps to thread the bulb in hole 16 and helps to retain the bulb in position.

For easier use and for more adequate contact, the strip may have a hole 26 for receiving the nose 28 of the battery. In conventional batteries, the nose 28 is electrically insulated from end wall 22 so as to prevent short-circuiting when the tester is applied, as shown in FIG. 4. One form of insulation is shown in FIG. 4.

What I claim is:
1. A portable battery testing device including:
   a first elongated, flexible strip formed of dielectric material and having one end thereof bent over on itself to form a two-ply section,
   there being a hole in said two-ply section for engagement with the threaded stem of an electric lamp, and
   a second elongated, flexible, conducting strip secured to one face of said first strip and extending from the edge of said hole to the other end of said first strip, the end of said second strip being exposed at said hole for engagement with the side of the stem of said light bulb,
   said strips being jointly deflectable into an arcuate configuration to bring the tip of said stem into engagement with one side of a battery to be tested and to bring the other end of said second strip into contact with the other side of the battery,
   said strips normally assuming a flat condition and at least one of them being also resilient whereby, when unrestrained, the laminated first and second strips will resume said flat condition.

References Cited
UNITED STATES PATENTS
2,522,660  9/1950  Bledsoe _____ 240—10.61 X
2,081,656  5/1937  Anthony.

RUDOLPH V. ROLINEC, Primary Examiner.
C. F. ROBERTS, Assistant Examiner.

U.S. Cl. X.R.
240—10.61; 324—73